United States Patent
Totani et al.

(10) Patent No.: US 9,052,506 B2
(45) Date of Patent: Jun. 9, 2015

(54) VIRTUAL IMAGE DISPLAY DEVICE AND MANUFACTURING METHOD OF VIRTUAL IMAGE DISPLAY DEVICE

(71) Applicant: SEIKO EPSON CORPORATION, Tokyo (JP)

(72) Inventors: Takahiro Totani, Suwa (JP); Masayuki Takagi, Shiojiri (JP); Toshiaki Miyao, Matsumoto (JP); Akira Komatsu, Kamiina-gun (JP); Takashi Takeda, Suwa (JP); Takeshi Fujishiro, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 143 days.

(21) Appl. No.: 13/633,527

(22) Filed: Oct. 2, 2012

(65) Prior Publication Data

US 2013/0088415 A1 Apr. 11, 2013

(30) Foreign Application Priority Data

Oct. 7, 2011 (JP) ................................. 2011-222585

(51) Int. Cl.
*G02B 27/01* (2006.01)
(52) U.S. Cl.
CPC .... *G02B 27/0176* (2013.01); *G02B 2027/0181* (2013.01); *G02B 2027/0178* (2013.01); *G02B 27/0172* (2013.01)

(58) Field of Classification Search
CPC ....................... G02B 27/01; G02B 2027/0178
USPC ............................................... 345/8; 359/630
See application file for complete search history.

(56) References Cited

U.S. PATENT DOCUMENTS

| | | | |
|---|---|---|---|
| 5,971,538 A * | 10/1999 | Heffner | 351/137 |
| 6,480,174 B1 * | 11/2002 | Kaufmann et al. | 345/8 |
| 7,643,215 B2 * | 1/2010 | Shin et al. | 359/630 |
| 2002/0034016 A1 | 3/2002 | Inoguchi et al. | |
| 2010/0164840 A1 * | 7/2010 | Yamamoto | 345/8 |
| 2012/0235900 A1 * | 9/2012 | Border et al. | 345/156 |
| 2013/0242405 A1 * | 9/2013 | Gupta | 359/631 |

FOREIGN PATENT DOCUMENTS

| | | |
|---|---|---|
| JP | A-2000-249969 | 9/2000 |
| JP | A-2008-172367 | 7/2008 |

* cited by examiner

*Primary Examiner* — Kent Chang
*Assistant Examiner* — Mark Edwards
(74) *Attorney, Agent, or Firm* — Oliff PLC

(57) ABSTRACT

In a virtual image display device, direction adjustment of an image optical axis, i.e., angle adjustment of a direction of eyes of an observer can be performed by providing a cushion member or adjusting an amount of shift between an image display unit and a projection system, and thereby, strain on eyes of an observer in use may be reduced. Even when the virtual image display device is used over a long period, for example, stress on the observer may be suppressed.

14 Claims, 10 Drawing Sheets

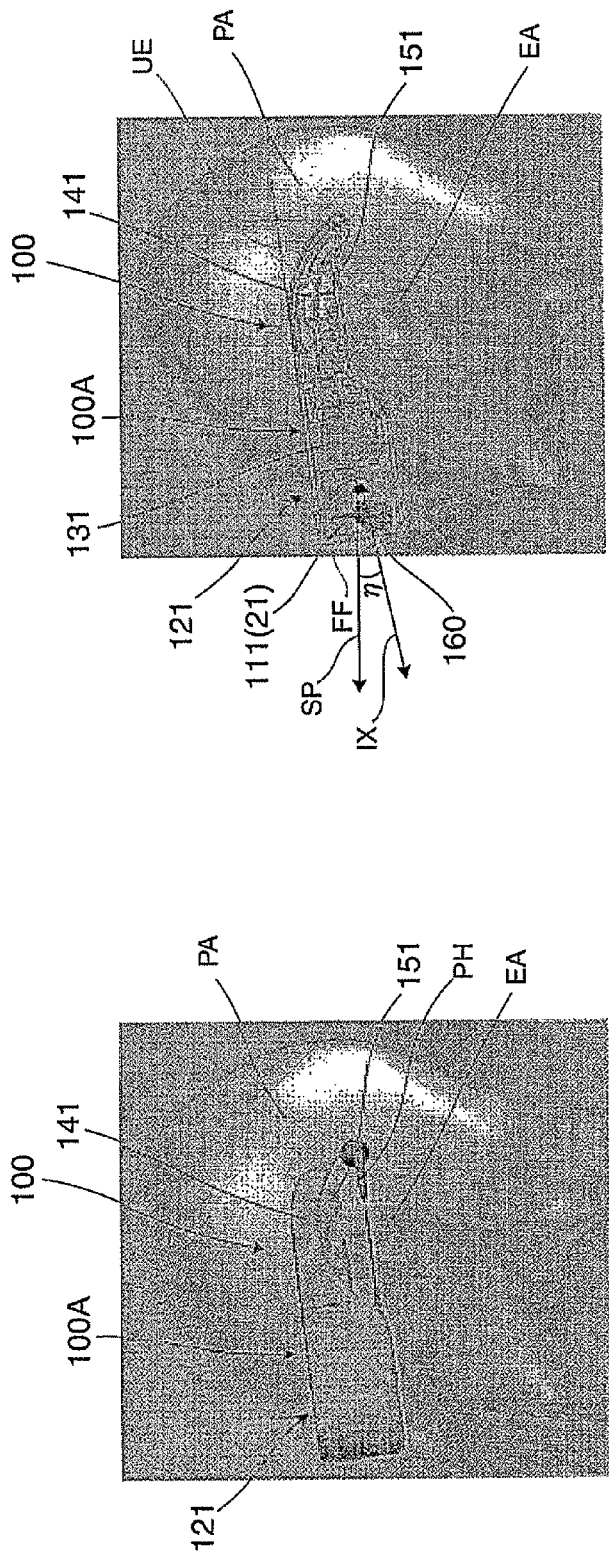
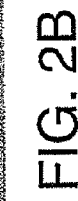
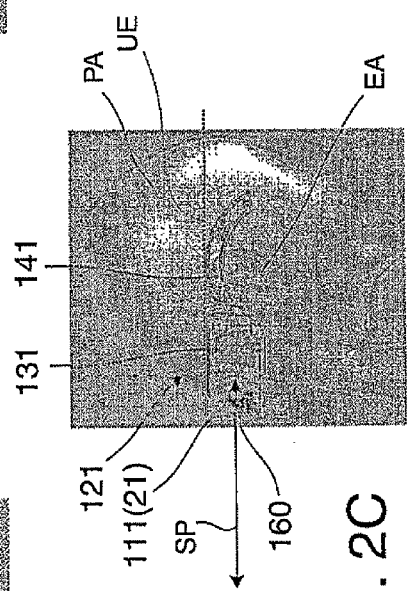
FIG. 2A
FIG. 2B
FIG. 2C

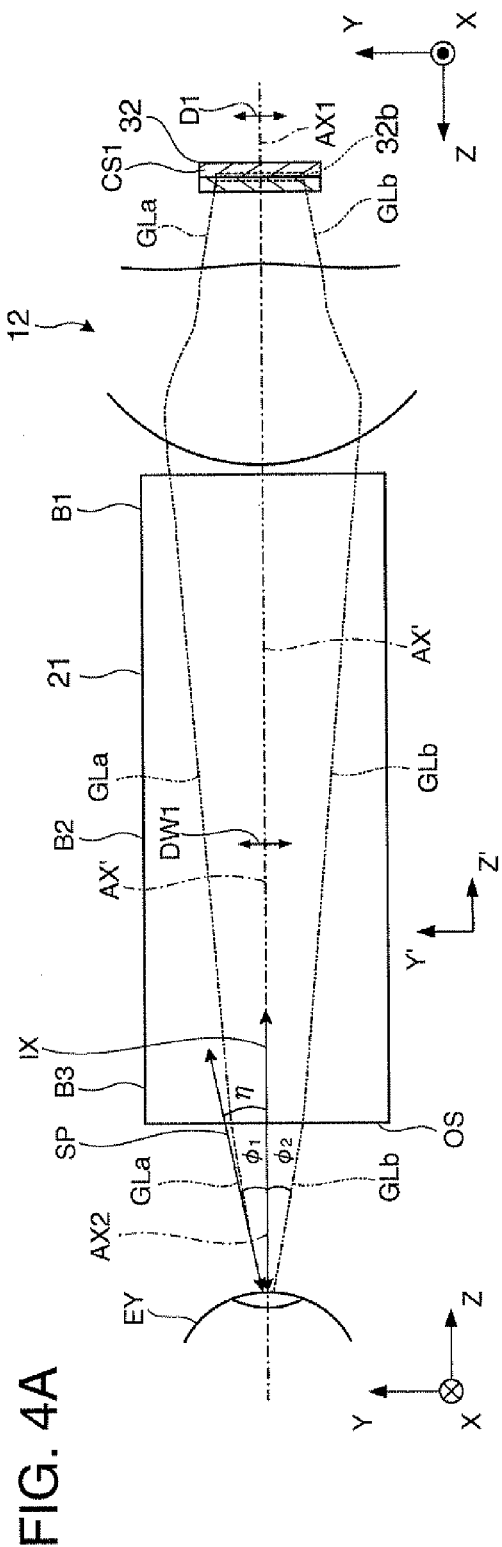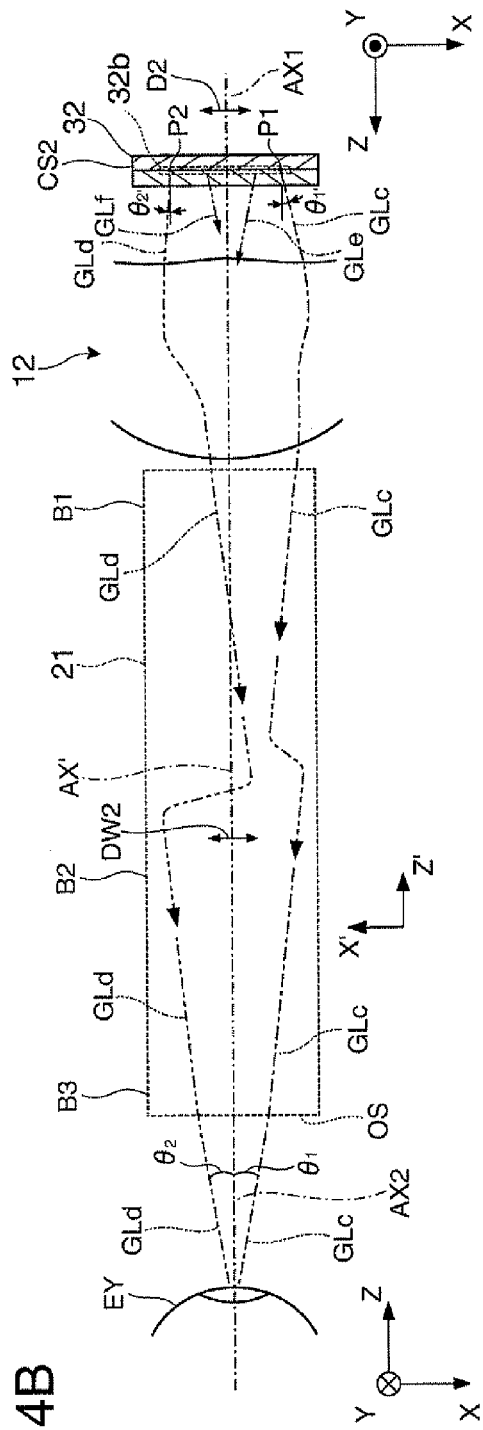
FIG. 4A
FIG. 4B

VIRTUAL IMAGE DISPLAY DEVICE AND MANUFACTURING METHOD OF VIRTUAL IMAGE DISPLAY DEVICE

BACKGROUND

1. Technical Field

The present invention relates to a virtual image display device such as a head-mounted display mounted on a head.

2. Related Art

Recently, as virtual image display devices that enable formation and observation of virtual images like head-mounted displays, various devices of a type of guiding image light from a display element to eyes of an observer using a light guide plate have been proposed (see Patent Document (JP-A-2008-172367) and Patent Document 2 (JP-A-2000-249969)).

Not only in the cases of Patent Documents 1 and 2, but many head-mounted displays generally have shapes like spectacles and sunglasses in view of downsizing and design of the devices. In the head-mounted display having the configuration, when image light is propagated along the shape, the image light is output with a direction of a center optical axis as the center thereof at nearly horizontal zero degrees. The observer continues to observe images while keeping the eyes straight ahead so that the direction of eyes may be the direction of the center optical axis of the image light.

However, the human eye has a structure of opening wide for observation in the state in which the observer looks straight ahead, and the eyelids of the observer take heavy strain. Therefore, when the state continues in a long period, the observer feels stress due to eyestrain. The head-mounted displays are intended for continuous use in long periods, such stress may be particularly problematic.

SUMMARY

An advantage of some aspects of the invention is to provide a virtual image display device that can reduce strain on eyes of observers during use and suppress stress on the observers even in the long periods of use.

A virtual image display device according to an aspect of the invention includes (a) an image display unit that forms image light, (b) a projection system that forms a virtual image by the image light output from the image display unit, (c) a light guide unit having (c1) a light-incident part that takes the image light that has passed through the projection system inside, (c2) a light guide part that guides the image light taken from the light-incident part by total reflection, and (c3) a light-exiting part that takes the image light through the light guide part to the outside, (d) a frame that supports the light guide unit, and (e) a tilt angle adjustment unit that adjusts an image optical axis of the image light output from the light guide unit in a direction at a tilt with respect to a front vision direction corresponding to the front of eyes of an observer. Here, the image optical axis of the image light corresponds to a principal ray of a component output from the center of the image of the image light output from the light-exiting part, and determines the direction of eyes of the observer who observes the image light. Further, the front vision direction of the observer refers to the front direction for the observer, and the horizontal direction is the front vision direction when the observer sits or stands straight and sees the front. The front vision direction is defined by fixing the shape of the frame that supports the light guide unit. That is, in the virtual image display device, the relative arrangement relationships among the image display unit, the projection system, and the light guide unit and the locations of the members in contact with the ears and the nose when worn by the observer are fixed at least by the frame supporting the light guide unit. The virtual image display device is fabricated while simulating the average locations of the eyes and the nose of the observer, and the frame shape is fixed based on the simulation, and thereby, the front vision direction supposed as the direction in which the observer looks straight ahead between the optical member and itself can be fixed.

In the virtual image display device, the tilt angle adjustment unit is provided and the adjustment with respect to the direction of the image optical axis, i.e., the angle adjustment of the direction of eyes of the observer can be performed with reference to the front vision direction. Thereby, for example, the direction of eyes of the observer may be naturally adjusted for downward observation for the observer. By the angle adjustment of the direction of eyes of the observer, compared to the case where observation is performed in a state in which the observer sees in the front vision direction, the strain on the eyes of the observer may be reduced and the stress on the observer may be suppressed even when the device is used over a long period.

In a specific aspect of the invention, the tilt angle adjustment unit is a projection optical axis adjustment unit that tilts a projection optical axis of the projection system with respect to the front vision direction. In this case, by tilting the projection optical axis of the projection system, the tilt of the image optical axis of the image light may be directly adjusted.

In another specific aspect of the invention, the projection optical axis adjustment unit tilts the projection optical axis by tilting the whole projection system, and tilts the whole light guide unit. In this case, by tilting the projection system and the light guide unit, the tilt of the image optical axis of the image light is adjusted.

In still another specific aspect of the invention, the projection optical axis adjustment unit is a cushion member provided in a part corresponding to a location of an ear of the observer of the frame. In this case, by adjusting the size of the cushion member, the tilt of the projection optical axis of the projection system may be adjusted, and thus, the tilt of the image optical axis of the image light may be easily adjusted.

In yet another specific aspect of the invention, the tilt angle adjustment unit is a shift structure in which a display center axis of the image display unit extending in parallel to the projection optical axis of the projection system is shifted in a direction perpendicular to the projection optical axis of the projection system. In this case, by adjusting an amount of shift in the shift structure, the tilt of the image optical axis of the image light may be easily adjusted.

In still yet another specific aspect of the invention, the light guide unit adjusts effective regions of the light-incident part, the light guide part, and the light-exiting part in response to an amount of shift of the image display unit by the shift structure. In this case, in the light guide unit, the image light from the image display unit may be reliably propagated in the light guide unit.

In further another specific aspect of the invention, a direction in which the projection optical axis of the projection system extends is along the front vision direction. In this case, for example, assuming that the observer wears spectacles, it is considered that the temples of the spectacles extend nearly along the front vision direction in typical design. Therefore, the projection optical axis of the projection system may be extended nearly along the temples of the spectacles, and downsizing of the device may be realized and design qualities may be improved.

In still further another specific aspect of the invention, the tilt angle adjustment unit has a reflection surface for taking the image light to the outside in the light-exiting part, and is an image extraction surface adjustment structure of adjusting an angle of the reflection surface. In this case, by adjusting the angle of the reflection surface, the tilt of the image optical axis of the image light may be adjusted.

In yet further another specific aspect of the invention, the tilt angle adjustment unit has a reflection surface for taking the image light to the outside in the light-exiting part, and a region of the reflection surface is distributed toward a periphery side of a light transmission region of the light guide unit in response to the direction in which the image optical axis of the image light is tilted. In this case, the image light with the tilted image optical axis at a desired angle may be reliably output in the light-exiting part.

In still yet further another specific aspect of the invention, the tilt angle adjustment unit tilts the image optical axis of the image light in a bird's eye direction corresponding to a side below the observer with respect to the front vision direction. In this case, the direction of eyes of the observer is directed in the bird's eye direction in which the observer observes the lower side than that in the front vision direction. In other words, observation at an angle at which the observer looks down may be realized.

In a further specific aspect of the invention, the tilt angle adjustment unit tilts a tilt angle of the image optical axis of the image light by seven degrees or more with respect to the front vision direction. In this case, the angle of the direction of eyes of the observer may be naturally lowered to the extent necessary for reduction of the strain on the eyes of the observer.

In a still further specific aspect of the invention, the light guide unit has a first reflection surface and a second reflection surface that are provided in parallel to each other and enable light guide by total reflection, the light-incident part has a third reflection surface forming a predetermined angle with respect to the first reflection surface, and the light-exiting part has a fourth reflection surface forming a predetermined angle with respect to the first reflection surface. In this case, the image lights at different times of reflections may be simultaneously combined, extracted as image light forming one virtual image, and the display size of the virtual image to be observed through the light-exiting part may be secured to be larger.

BRIEF DESCRIPTION OF THE DRAWINGS

The invention will be described with reference to the accompanying drawings, wherein like numbers reference like elements.

FIG. 2A is a side view showing a state in which the virtual image display device is worn, FIG. 2B is a perspective view. FIG. 2C shows a comparative example.

FIG. 4A is a conceptual diagram in which optical paths with respect to a longitudinal first direction are developed, and FIG. 4B is a conceptual diagram in which optical paths with respect to a lateral second direction are developed.

DESCRIPTION OF EXEMPLARY EMBODIMENTS

First Embodiment

As below, a virtual image display device according to the first embodiment of the invention will be explained in detail with reference to the drawings.

A. Appearance of Virtual Image Display Device Etc.

Figure 1:
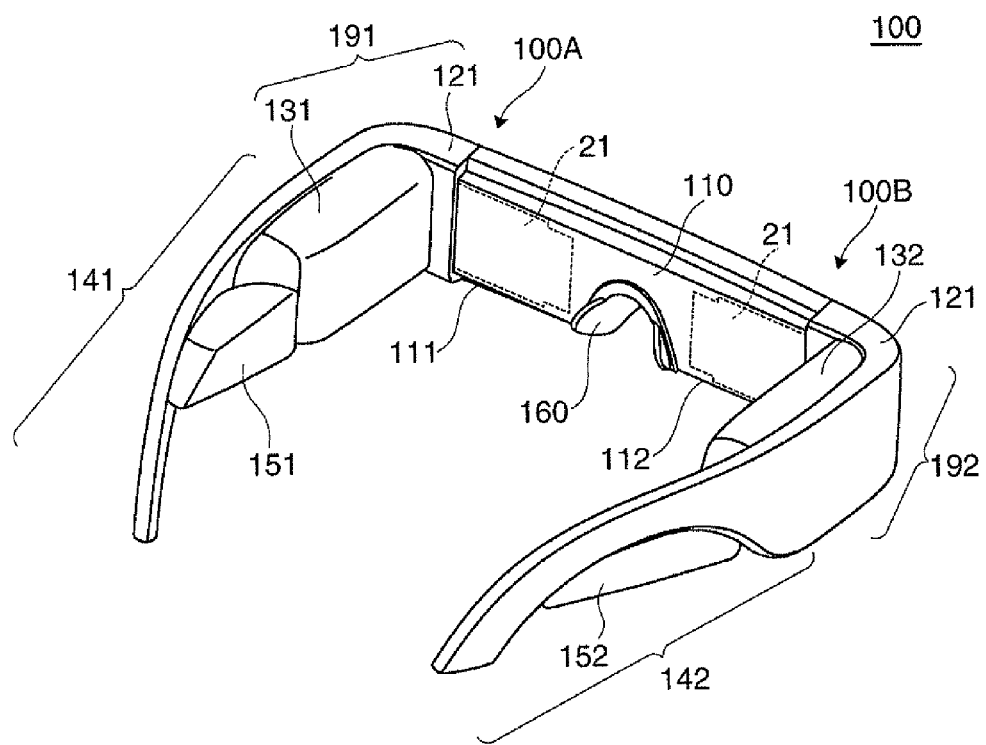
FIG. 1 is a perspective view showing a virtual image display device of the first embodiment.

A virtual image display device 100 of the embodiment shown in FIG. 1 is a head-mounted display having an appearance of spectacles, and enables an observer wearing the virtual image display device 100 to recognize image light by a virtual image and observe an external image in a see-through manner. The virtual image display device 100 includes an optical panel 110 that covers the view of observer, a frame 121 that supports the optical panel 110 etc., first and second drive parts 131, 132 added to parts from front cover parts 191, 192 to temples 141, 142 of the frame 121. Specifically, the frame 121 has ear cushion members 151, 152 in parts adjacent to the first and second drive parts 131, 132 of the temples 141, 142. That is, the frame 121 also supports the respective drive parts 131, 132 and the cushion members 151, 152, and fixes the relative arrangement relationship, among these members and the respective members forming the virtual image display device 10 such as the optical panel 110. Here, the optical panel 110 has a first panel part 111 and a second panel part 112, and the panel parts 111, 112 are integrally connected at the center to form a plate-like member. A first display unit 100A formed by combining the first panel part 111 on the left in the drawing and the first drive part 131 is a part that forms a virtual image for left eye and functions as a virtual image display device by itself. Further, a second display unit 100B formed by combining the second panel part 112 on the right in the drawing and the second drive part 132 is a part that forms a virtual image for right eye and functions as a virtual image display device by itself.

FIG. 2A etc. show states in which an observer PA wearing the virtual image display device 100 is seen from the left side. Note that the states seen from the right side are the same and their illustration etc. are omitted. As shown in FIGS. 2A and 2B, when the virtual image display device 100 is worn, an ear cushion member 151 is in contact with an ear EA of the observer PA as a wearer. Thereby, compared to the case where typical spectacles or sunglasses are worn, the virtual image display device 100 slightly tilts forward. Specifically, in the case of a typical virtual image display device provided with no cushion member 151 shown in FIG. 2C as a comparative example, the direction in which the upper end surface UE extends is nearly in parallel to the horizontal surface. However, in the embodiment, as shown in FIG. 2B, the cushion member 151 is provided and the direction in which the upper end surface UE extends tilts forward at about 7° with respect to the horizontal surface.

Note that the observer PA may also wear an earphone PH attached to the virtual image display device 100 to hear sound with projected images.

Here, in the front direction of the observer PA wearing the virtual image display device 100, i.e., for example, the horizontal direction when the observer sits or stands straight and sees the front is referred to as "front vision direction SP" of the virtual image display device 100. The front vision direction SP is defined when the virtual image display device 100 is manufactured by fixing the shape of the frame 121 while simulating the average locations of eyes, nose, etc. of a human, i.e., by determining relative arrangement of the respective members forming the virtual image display device 100. The device is designed so that an image formed by the virtual image display device 100 may be formed along the surface perpendicular to the upper end surface UE in parallel to the front surface FF of the virtual image display device 100 for the observer PA. In this case, like the comparative example shown in FIG. 2C, when the device is designed so that the upper end surface UE may be nearly in parallel to the front vision direction SP, the front vision direction SP coincides with the direction of the direction of eyes of the observer PA. On the other hand, in the example of the embodiment shown in FIG. 2B, the upper end surface UE tilts at about 7° with respect to the front vision direction SP as illustrated, i.e., the whole device tilts with respect to the front vision direction SP. Therefore, the direction of eyes of the observer PA is slightly downward with respect to the front vision direction SP. In the embodiment, as illustrated, the axis extending from the center of the front surface FF of the virtual image display device 100 in this direction is referred to as "image optical axis IX". As will be described in detail, the image optical axis IX indicates the observation direction of the observer PA, and corresponds to a principal ray of a component output from the center of the image of the image light output from the virtual image display device 100. Further, the angle formed by the front vision direction SP and the image optical axis IX is referred to "tilt angle η". From the above description, in the illustrated case, the tilt angle η is about 7 degrees.

Note that, although the front vision direction SP corresponds to the horizontal direction when the observer PA sits or stands straight and sees the front as described above, the virtual image display device 100 moves with the observer PA and the front vision direction SP does not constantly coincide with the horizontal direction. However, the value of the tilt angle η is a constant value regardless of the posture of the observer PA.

B. Structure of Display Device

Figure 3A:
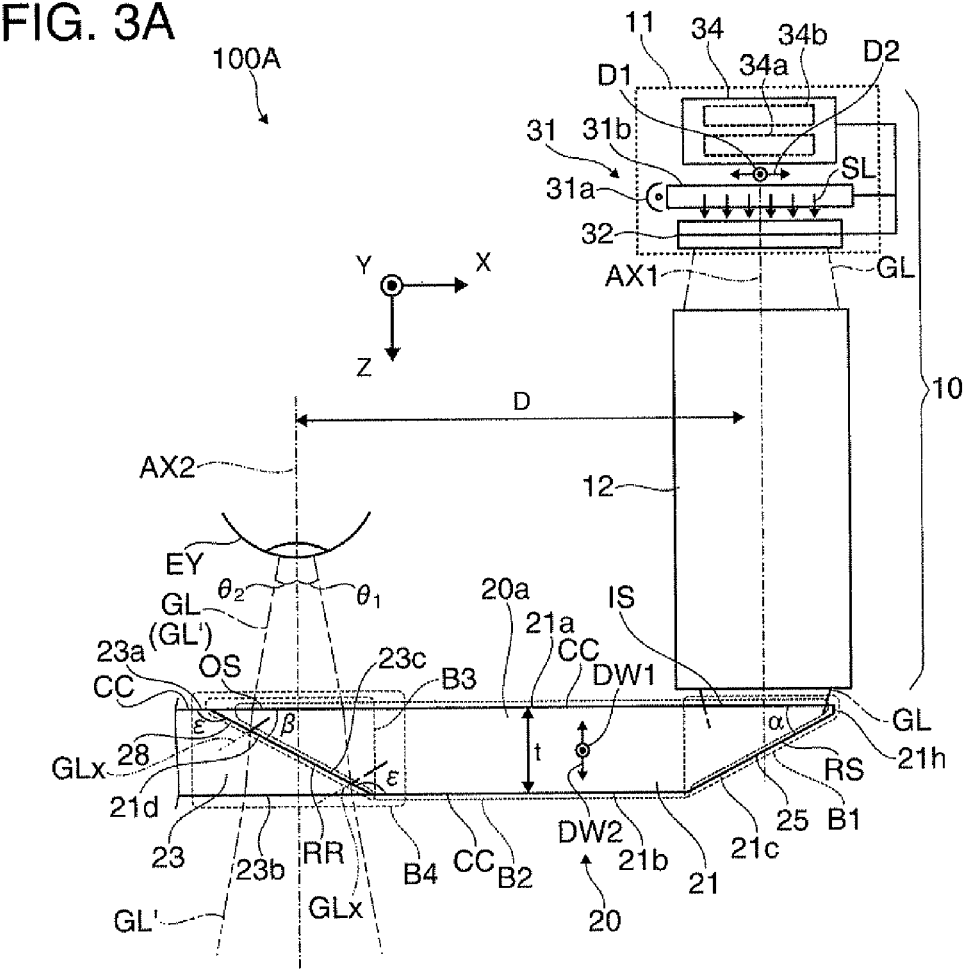
FIG. 3A is a plan view of a main body part of a first display unit forming the virtual image display device.
Figure 3B:
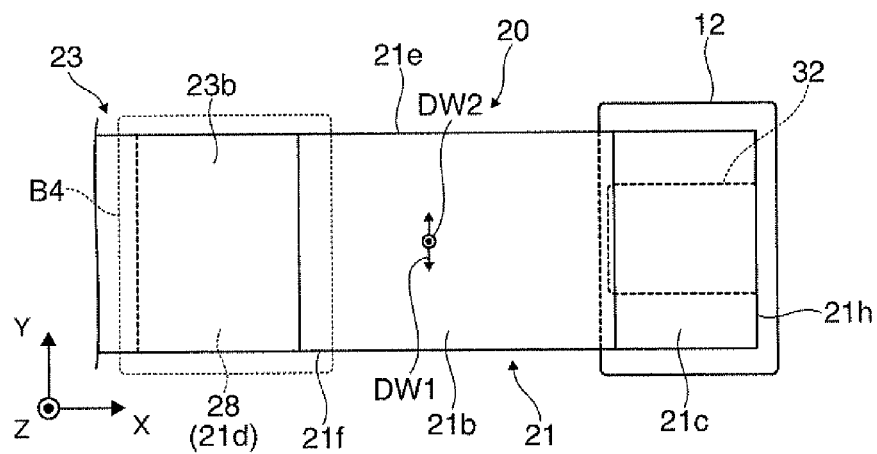
FIG. 3B is a front view of the main body part.

As shown in FIGS. 3A and 3B, the first display unit 100A includes an image forming device 10 and a light guide unit 20. Here, the image forming device 10 corresponds to the first drive part 131 in FIG. 1 and the light guide unit 20 corresponds to the first panel part 111 in FIG. 1. Note that the second display unit 100B shown in FIG. 1 has the same structure as that of the first display unit 100A and just horizontally reversed, and the detailed explanation of the second display unit 100B will be omitted.

The image forming device 10 has an image display unit 11 and a projection system 12. Of them, the image display unit 11 has an illumination device 31 that outputs two-dimensional illumination light SL, a liquid crystal display device 32 as a transmissive spatial light modulation device, and a drive control part 34 that controls the operation of the illumination device 31 and the liquid crystal display device 32.

The illumination device 31 has a light source 31a that generates light containing three colors of red, green, blue, and a backlight light guide part 31b that diffuses the light from the light source 31a into luminous flux having a rectangular section. The liquid crystal display device 32 spatially modulates the illumination light SL from the illumination device 31 and forms image light to be displayed as a moving image or the like. The drive control part 34 includes a light source driver circuit 34a and a liquid crystal driver circuit 34b. The light source driver circuit 34a supplies electric power to the light source 31a of the illumination device 31 and outputs the illumination light SL with stable illuminance. The liquid crystal driver circuit 34b outputs an image signal or a drive signal to the liquid crystal display device 32, and thereby, forms color image light as an original of a moving image or a still image as a transmittance pattern. Note that the liquid crystal driver circuit 34b may be provided with an image processing function, or an external control circuit may be provided with the image processing function. The projection system 12 is a collimator lens that brings the image lights output from the respective points on the liquid crystal display device 32 into parallel luminous fluxes.

In the liquid crystal display device 32, a first direction D1 corresponds to a direction in which a longitudinal section containing a first optical axis AX1 passing through the center of the projection system 12 and a specific line in parallel to a third reflection surface 21c of a light guide member 21, which will be described later, extends, and a second direction D2 corresponds to a direction in which a cross section containing the first optical axis AX1 and the normal line of the third reflection surface 21c extends. That is, in the position of the liquid crystal display device 32, the first direction D1 corresponds to the longitudinal Y direction and the second direction D2 corresponds to the lateral X direction.

The light guide unit 20 is formed by bonding the light guide member 21 and a light transmission member 23, and forms an optical member having a flat plate shape extending in parallel to the XY plane as a whole.

Of the light guide unit 20, the light guide member 21 is a trapezoidal prism-like member in the plan view, and has the first reflection surface 21a, a second reflection surface 21b, the third reflection surface 21c, and a fourth reflection surface 21d as side surfaces. Further, the light guide member 21 has an upper surface 21e and a lower surface 21f adjacent to the first, second, third, and fourth reflection surfaces 21a, 21b, 21c, 21d and opposed to each other. Here, the first and second reflection surfaces 21a, 21b extend along the XY plane and are separated by a thickness t of the light guide member 21. Further, the third reflection surface 21c is tilted at an acute angle α equal to or less than 45° with respect to the XY plane, and the fourth reflection surface 21d is tilted at an acute angle β equal to or less than 45° with respect to the XY plane, for example. The first optical axis AX1 passing through the third reflection surface 21c and the second optical axis AX2 passing through the fourth reflection surface 21d are provided in parallel and separated at a distance D. Note that an end surface 21h is provided between the first reflection surface 21a and the third reflection surface 21c to remove an edge. The light guide member 21 has a polyhedral outer shape with seven surfaces including the end surface 21h.

The above described first optical axis AX1 is a projection optical axis passing through the center of the projection system 12, and the second optical axis AX2 is a center optical axis of the image light output from the light guide unit 20. Specifically, in the embodiment, the second optical axis AX2 corresponds to the image optical axis IX (see FIG. 2B) that determines the direction of eyes of the observer.

The light guide member 21 guides light using total reflection by the first and second surfaces 21a, 21b, there are a direction in which the light is folded by reflection when guided and a direction in which the light is not folded by reflection when guided. In consideration of the image guided by the light guide member 21, the lateral direction in which the light is folded by plural times of reflection when guided, i.e., the confinement direction is perpendicular to the first and second reflection surfaces 21a, 21b (in parallel to the Z-axis), and corresponds to the second direction D2 of the liquid crystal display device 32 when the optical path is developed to the light source side as described below. On the other hand, the longitudinal direction in which the light is not folded and propagates by reflection when guided, i.e., the non-confinement direction is in parallel to the first and second reflection surfaces 21a, 21b and the third reflection surface 21c (in parallel to the Y-axis) and corresponds to the first direction D1 of the liquid crystal display device 32 when the optical path is developed to the light source side as described below. Note that, in the light guide member 21, the main light guide direction in which the propagated luminous fluxes travel as a whole is −X direction.

The light guide member 21 is formed using a resin material exhibiting high light-transmissivity in the visible range. The light guide member 21 includes a main body part 20a of a block-like member integrally molded by injection molding, and the main body part 20a is formed by injecting a heat or photo polymerization resin material into a mold and thermally curing or photo curing the material, for example. As described above, the light guide member 21 has the main body part 20a as an integrally-molded member, but functionally, the part may be divided into a light-incident part B1, a light guide part B2, and a light-exiting part B3.

The light-incident part B1 is a triangular prism-like part, and has a light-incident surface IS as a part of the first reflection surface 21a and the third reflection surface 21c opposed to the light-incident surface IS. The light-incident surface IS is a surface at the rear side or the observer's side for taking in the image light GL from the image forming device 10, and extends to face the projection system 12 perpendicularly to its first optical axis AX. The third reflection surface 21c has a rectangular profile and has a mirror layer 25 (mirror film) on the entire rectangular region as a total reflection mirror for reflecting the image light GL that has passed through the light-incident surface IS and guiding it into the light guide part B2. The mirror layer 25 is formed by forming a film on a slope RS of the main body part 20a of the light guide member 21 by evaporation of aluminum or the like. The third reflection surface 21c is tilted at the acute angle α=25° to 27°, for example, with respect to the first optical axis AX1 of the projection system 12 or the XY plane, folds the image light GL that has entered from the light-incident surface IS toward the direction as a whole in the −X direction near the −Z direction as a whole, and thereby, reliably couples the image light GL within the light guide part B2.

The light guide part B2 has the first reflection surface 21a and the second reflection surface 21b that respectively totally reflect the image lights that have been folded in the light-incident part B1 as two surfaces opposed to each other and extending in parallel to the XY plane. The distance between the first and second reflection surfaces 21a, 21b, i.e., the thickness t of the light guide member 21 is set to about 9 mm, for example. Here, the first reflection surface 21a is located at the rear side or the observer's side near the image forming device 10, and the second reflection surface 21b is located at the front side or the external side far from the image forming device 10. In this case, the first reflection surface 21a is a surface part in common with the light-incident surface IS and a light-exiting surface OS, which will be described later. The first and second reflection surfaces 21a, 21b are total reflection surfaces using refractive index differences, and provided with no reflection coatings such as mirror layers, but coated with hard coating layers CC as surface coating layers for prevention of damage on the surfaces and prevention of reduction of resolution of images.

The image light GL reflected by the third reflection surface 21c of the light-incident part B1 first enters the first reflection surface 21a and is totally reflected. Then, the image light GL enters the second reflection surface 21b and is totally reflected. Subsequently, the operation is repeated, and the image light is guided in the main light guide direction toward the deeper side of the light guide unit 20, i.e., the +Z side at which the light-exiting part B3 is provided. Note that, since the first and second reflection surfaces 21a, 21b are provided with no reflection coatings, the external light or outside light entering the second reflection surface 21b from the external side is transmitted through the light guide part B2 at high transmittance. That is, the light guide part B2 is of a see-through type that enables see-through observation of an external image.

The light-exiting part 23 is a triangular prism-like part, and has the light-exiting surface OS as a part of the first reflection surface 21a and the fourth reflection surface 21d opposed to the light-exiting surface OS. The light-exiting surface OS is a surface at the rear side for outputting the image light GL toward an eye EY of the observer, forms a part of the first reflection surface 21a like the light-incident surface IS, and extends perpendicularly to the second optical axis AX2. The distance D between the second optical axis AX2 passing through the light-exiting part B3 and the first optical axis AX1 passing through the light-incident part 21 is set to 50 mm, for example, in consideration of the width of the head of the observer or the like. The fourth reflection surface 21d is a rectangular flat surface and has a half mirror layer 28 for reflecting the image light GL that has entered through the first and second reflection surfaces 21a, 21b and outputting the light to the outside of the light-exiting part B3, and transmitting external light. That is, the half mirror layer 28 is a light folding reflection film for folding image light and a semi-transmissive reflection film having light-transmissivity. The half mirror layer (semi-transmissive reflection film) 28 is formed by deposition of a metal reflection film of silver or the like and a dielectric multilayer film, for example, to be superimposed on a slope RR forming the fourth reflection surface 21d of the light guide member 21. The reflectance of the half mirror layer 28 for the image light GL is set from 10% to 50% in the assumed incident angle range of the image light GL in view of facilitation of see-through observation of external light GL'. The reflectance of the half mirror layer 28 for the image light GL in a specific working example is set to 20%, for example, and the transmittance for the image light GL is set to 80%, for example.

The fourth reflection surface 21d is tilted at the acute angle α=25° to 27°, for example, with respect to the second optical axis AX2 perpendicular to the first reflection surface 21a or the XY plane, partially reflects the image light GL that has entered through the first and second reflection surfaces 21a, 21b of the light guide part B2 by the half mirror layer 28 and folds the light toward the −Z direction as a whole, and thereby, allows the light to pass through the light-exiting surface OS.

Note that the component of the image light GL that has transmitted through the fourth reflection surface 21d enters the light transmission member 23 and is not used for formation of images.

The light transmission member 23 is formed using the same material with the same refractive index as those of the main body of the light guide member 21, and has a first surface 23a, a second surface 23b, and a third surface 23c. The first and second surfaces 23a, 23b extend along the XY plane. Further, the third surface 23c is tilted with respect to the XY plane and provided to be opposed and in parallel to the fourth reflection surface 21d of the light guide member 21. That is, the light transmission member 23 has a wedge-shaped member sandwiched between the second surface 23b and the third surface 23c. The light transmission member 23 is formed using a resin material exhibiting high light-transmissivity in the visible range like the light guide member 21. The light transmission member 23 is a block-like member integrally molded by injection molding, and formed by injecting a heat or photo polymerization resin material into a mold and thermally curing it or photo curing it, for example. Note that, on the surface of the light transmission member 23, the hard coating layer CC is provided in common with the light guide member 21.

In the light transmission member 23, the first surface 23a is provided on the extension surface of the first reflection surface 21a provided on the light guide member 21 and located at the rear side near the eye EY of the observer, and the second surface 23b is provided on the extension surface of the second reflection surface 21b provided on the light guide member 21 and located at the front side far from the eye EY of the observer. The third surface 23c is a rectangular light transmission surface bonded to the fourth reflection surface 21d of the light guide member 21 using an adhesive. The angle formed by the first surface 23a and the third surface 23c is equal to the angle ∈ formed by the second reflection surface 21b and the fourth reflection surface 21d of the light guide member 21, and the angle formed by the second surface 23b and the third surface 23c is equal to the angle β formed by the first reflection surface 21a and the third reflection surface 21c of the light guide member 21.

The light transmission member 23 and the light guide member 21 form a see-through part B4 in or near the bonding part of them. That is, the first and second surfaces 23a, 23b are provided with no reflection coatings such as mirror layers, and transmit the external light GL' at high transmittance like the light guide part B2 of the light guide member 21. Also, the third surface 23c can transmit the external light GL' at high transmittance, however, because the fourth reflection surface 21d of the light guide member 21 has the half mirror layer 28, the external light GL' passing through the third surface 23c is reduced by 20%, for example. That is, the observer observes superimposition of the image light GL reduced to 20% and the external light GL' reduced to 80%.

C. Outline of Optical Paths of Image lights

FIG. 4A is a diagram for explanation of optical paths in the first direction D1 corresponding to the longitudinal section CS1 of the liquid crystal display device 32. In the longitudinal section along the first direction D, i.e., the YZ plane (the Y' Z' plane after development), of the image lights output from the liquid crystal display device 32, a component output from the upper end side (+Y side) of a display area 32b shown by dashed-dotted lines in the drawing is referred to as image light GLa and a component output from the lower end side (−Y side) of the display area 32b shown by dashed-two dotted lines in the drawing is referred to as image light GLb.

The upper image light GLa is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle $\phi_1$ from the upper side. On the other hand, the lower image light GLb is brought into parallel luminous flux by the projection system 12, passes through the light-incident part B1, the light guide part B2, and the light-exiting part 83 of the light guide member 21 along the developed optical axis AX', and enters the eye EY of the observer as parallel luminous flux at a tilt of an angle $\phi_2$ ($|\phi_2|=|\phi_1|$) from the lower side. The above described angles $\phi_1$, $\phi_2$ correspond to upper and lower half angles of view, and are set to 6.5°, for example. Note that, as illustrated, from the relationship with the first optical axis AX1 corresponding to the optical axis AX', the extension direction of the image optical axis IX coincides with the extension direction of the optical axis AX'. That is, the direction of the eyes EY is slightly downward with respect to the front vision direction SP.

FIG. 4B is a diagram for explanation of optical paths in the second direction (confinement direction or combination direction) D2 corresponding to the cross section CS2 of the liquid crystal display device 32. In the cross section CS2 along the second direction (confinement direction or combination direction) D2, i.e., the XZ plane (the X'Z' plane after development), of the image lights output from the liquid crystal display device 32, a component output from a first display point P1 at the right end side (+X side) toward the display area 32b shown by dashed-dotted lines in the drawing is referred to as image light GLc and a component output from a second display point P2 at the left end side (−X side) toward the display area 32b shown by dashed-two dotted lines in the drawing is referred to as image light GLd. In FIG. 4B, for reference, image light GLe output from the rightward inner side and image light GLf output from the leftward inner side are added.

The image light GLc from the first display point P1 on the right is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle $\theta_1$ from the right side. On the other hand, the image light GLd from the second display point P2 on the left is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle $\theta_2$ ($|\theta_2|=|\theta_1|$) from the left side. The above described angles $\theta_1$, $\theta_2$ correspond to right and left half angles of view, and are set to 10°, for example.

Note that, regarding the lateral direction of the second direction D2, the image lights GLc, GLd are folded by reflection in the light guide member 21 and the numbers of reflections are different, and the respective image lights GLc, GLd are discontinuously illustrated in the light guide member 21. Further, regarding the eye EY of the observer, the direction of view is vertically inverted compared to that in the case of FIG. 3A. As a result, regarding the lateral direction, the screen is horizontally reversed as a whole, however, by processing the light guide member 21 with high accuracy in a manner, which will be described later in detail, the right-half image of the liquid crystal display device 32 and the left-half image of the liquid crystal display device 32 are continuously and seamlessly joined. Note that, in consideration of the different numbers of times of reflection of the image lights GLc, GLd within the light guide member 21 from each other, the output angle $\theta_1'$ of the right image light GLc and the output angle $\theta_2'$ of the left image light GLd are set to different angles.

According to the above described configuration, the image lights GLa, GLb, GLc, GLd entering the eye EY of the observer are virtual images from infinity. With respect to the longitudinal first direction D1, the image formed on the liquid crystal display device 32 is erected and, with respect to the lateral second direction D2, the image formed on the liquid crystal display device 32 is inverted.

D. Optical Paths of Image Lights with Respect to Lateral Direction

Figure 5:
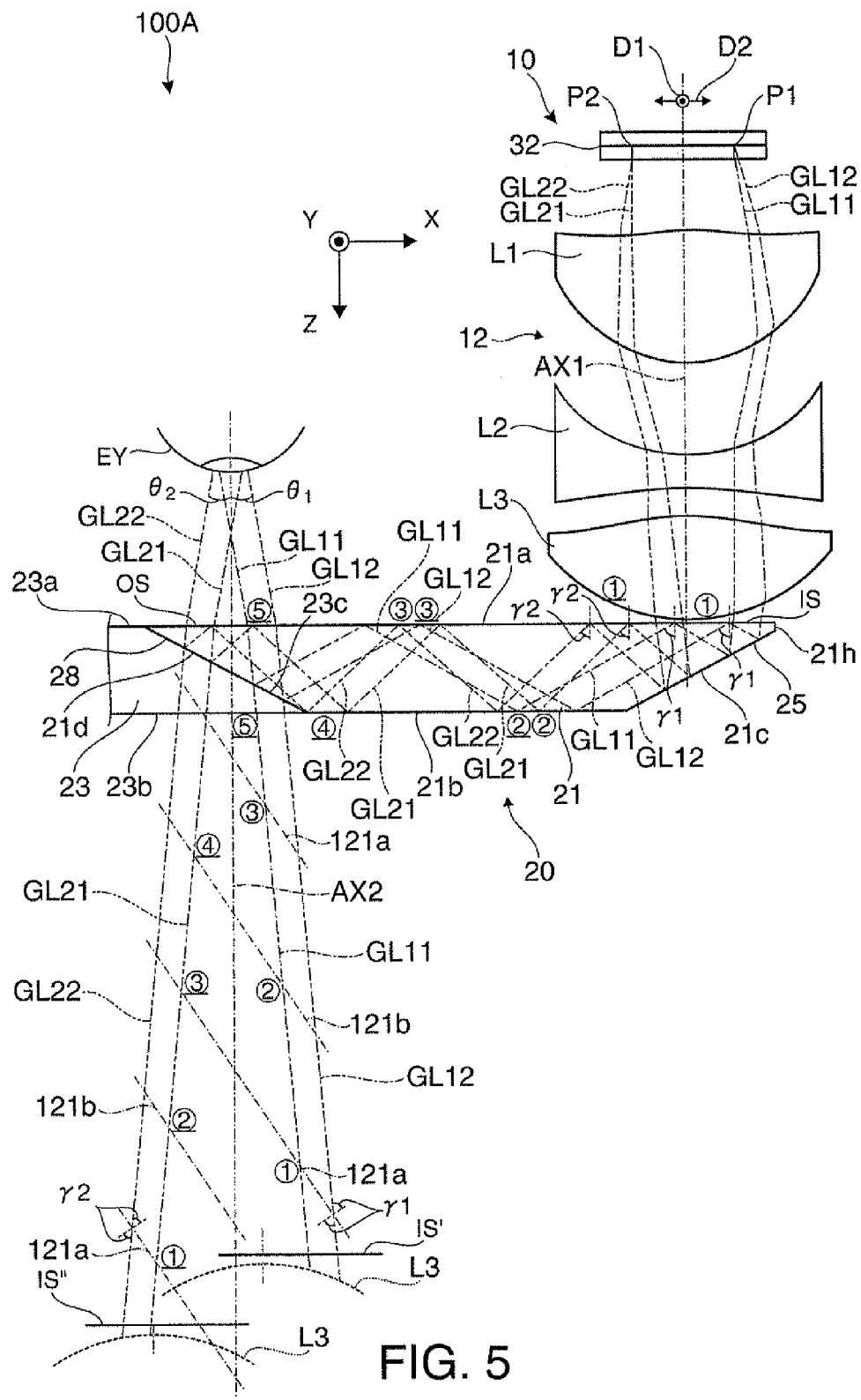
FIG. 5 is a plan view for specific explanation of optical paths in an optical system of the virtual image display device.

FIG. 5 is a sectional view for explanation of specific optical paths in the first display unit 100A. The projection system 12 has three lenses L1, L2, L3.

The image lights GL11, GL12 from the first display point P1 on the right of the liquid crystal display device 32 pass through the lenses L1, L2, L3 of the projection system 12 into parallel luminous fluxes, and enter the light-incident surface IS of the light guide member 21. The image lights GL11, GL12 that have been guided into the light guide member 21 are repeatedly totally reflected at equal angles on the first and second reflection surfaces 21a, 21b, and finally output as parallel luminous fluxes from the light-exiting surface OS. Specifically, the image lights GL11, GL12 are reflected by the third reflection surface 21c of the light guide member 21 as parallel luminous fluxes, and then, enter the first reflection surface 21a of the light guide member 21 at a first reflection angle γ1 and are totally reflected (the first total reflection). Then, the image lights GL11, GL12 enter the second reflection surface 21b with the first reflection angle γ1 held and are totally reflected (the second total reflection), and then, enter the first reflection surface 21a again and are totally reflected (the third total reflection). As a result, the image lights GL11, GL12 are totally reflected by the first and second reflection surfaces 21a, 21b at three times in total, and enter the fourth reflection surface 21d. The image lights GL11, GL12 are reflected by the fourth reflection surface 21d at the same angle as that by the third reflection surface 21c, and output from the light-exiting surface OS as parallel luminous fluxes at the tilt of the angle $\theta_1$ with respect to the second optical axis AX2 perpendicular to the light-exiting surface OS.

The image lights GL21, GL22 from the second display point P2 on the left of the liquid crystal display device 32 pass through the lenses L1, L2, L3 of the projection system 12 into parallel luminous fluxes, and enter the light-incident surface IS of the light guide member 21. The image lights GL21, GL22 that have been guided into the light guide member 21 are repeatedly totally reflected at equal angles on the first and second reflection surfaces 21a, 21b, and finally output as parallel luminous fluxes from the light-exiting surface OS. Specifically, the image lights GL21, GL22 are reflected by the third reflection surface 21c of the light guide member 21 as parallel luminous fluxes, then, enter the first reflection surface 21a of the light guide member 21 at a second reflection angle γ2 (γ2<γ1), and are totally reflected (the first total reflection). Then, the image lights GL21, GL22 enter the second reflection surface 21b with the second reflection angle γ2 held and are totally reflected (the second total reflection), enter the first reflection surface 21a again and are totally reflected (the third total reflection), enter the second reflection surface 21b again and are totally reflected (the fourth total reflection), and enter the first reflection surface 21a again and are totally reflected (the fifth total reflection). As a result, the image lights GL21, GL22 are totally reflected by the first and second reflection surfaces 21a, 21b at five times in total, and enter the fourth reflection surface 21d. The image lights GL21, GL22 are reflected by the fourth reflection surface 21d at the same angle as that by the third reflection surface 21c, and output from the light-exiting surface OS as parallel luminous fluxes at the tilt of the angle $\theta_2$ with respect to the second optical axis AX2 perpendicular to the light-exiting surface OS.

In FIG. 5, a hypothetical first surface 121a corresponding to the first reflection surface 21a when the light guide member 21 is developed and a hypothetical second surface 121b corresponding to the second reflection surface 21b when the light guide member 21 is developed are illustrated. According to the development, it is known that the image lights GL11, GL12 from the first display point P1 pass through an incident equivalent surface IS' corresponding to the light-incident surface IS, then, pass through the first surface 121a twice, pass through the second surface 121b once, are output from the light-exiting surface OS, and enter the eye EY of the observer, and the image lights GL21, GL22 from the second display point P2 pass through an incident equivalent surface IS" corresponding to the light-incident surface IS, then, pass through the first surface 121a at three times, pass through the second surface 121b twice, are output from the light-exiting surface OS, and enter the eye EY of the observer. From a different point of view, the observer observes superimposition of the lenses L3 of the projection system 12 existing near the incident equivalent surfaces IS', IS" in the two different positions.

Figure 6A:
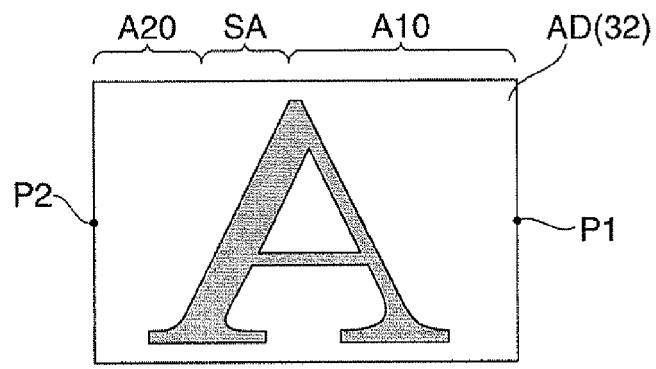
FIG. 6A shows a display surface of a liquid crystal display device.
Figure 6B:
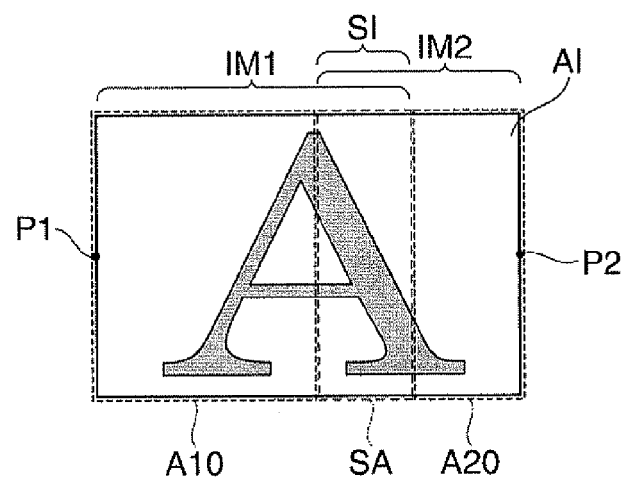
FIG. 6B is a diagram for conceptual explanation of a virtual image of the liquid crystal display device seen from an observer.
Figure 6C:
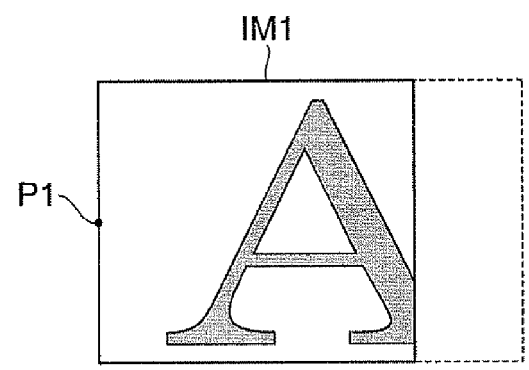
FIGS. 6C and 6D are diagrams for explanation of partial images forming the virtual image.
Figure 6D:
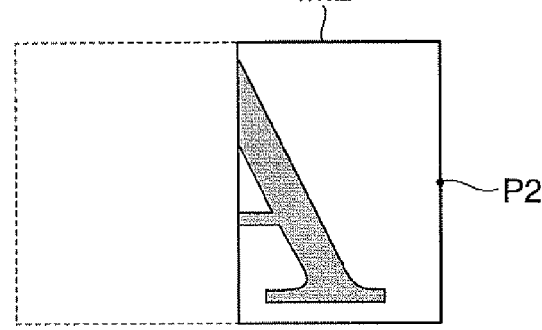

FIG. 6A is a diagram for conceptual explanation of the display surface of the liquid crystal display device 32, FIG. 6B is a diagram for conceptual explanation of a virtual image of the liquid crystal display device 32 seen from the observer, and FIGS. 6C and 6D are diagrams for explanation of partial images forming the virtual image. A rectangular image formation area AD provided in the liquid crystal display device 32 shown in FIG. 6A is observed as a virtual display area AI shown in FIG. 6B. On the left of the virtual display area AI, a first projection image IM1 corresponding to the part from the center to the right side of the image formation area AD of the liquid crystal display device 32 is formed and the first projection image IM1 is a partial image without the right side as shown in FIG. 6C. Further, on the right of the virtual display area AI, a projection image IM2 corresponding to the part from the center to the left side of the image formation area AD of the liquid crystal display device 32 is formed as a virtual image and the second projection image IM2 is a partial image without the left side as shown in FIG. 6D.

Of the liquid crystal display device 32 shown in FIG. 6A, a first partial area A10 that forms only the first projection image (virtual image) IM1 contains the first display point P1 on the right end of the liquid crystal display device 32, for example, and outputs the image lights GL11, GL12 to be totally reflected at three times in total in the light guide part B2 of the light guide member 21. A second partial area A20 that forms only the second projection image (virtual image) IM2 out of the liquid crystal display device 32 contains the second display point P2 on the left end of the liquid crystal display device 32, for example, and outputs the image lights GL21, GL22 to be totally reflected at five times in total in the light guide part B2 of the light guide member 21. The image light from a band SA sandwiched between the first and second partial areas A10, A20 and extending longitudinally near the center of the image formation area AD of the liquid crystal display device 32 forms an overlapping image SI as shown in FIG. 6B. That is, the image light from the band SA of the liquid crystal display device 32 is brought into the first projection image IM1 formed by the image lights GL11, GL12 totally reflected at three times in total in the light guide part B2 and the second projection image IM2 formed by the image lights GL21, GL22 totally reflected at five times in total in the light guide part B2, and the images are superimposed on the virtual display area AI. When the processing of the light guide member 21 is precise and the accurately collimated luminous fluxes are formed by the projection system 12, misalignment and blurring due to superimposition of the two projection images IM1, IM2 may be prevented in the overlapping image SI.

In the above description, the number of times of total reflection of the image lights GL11, GL12 output from the first partial area A10 containing the first display point 21 on the right of the liquid crystal display device 32 by the first and second reflection surfaces 21a, 21b has been three in total and the number of times of total reflection of the image lights GL21, GL22 output from the second partial area A20 containing the second display point 22 on the left of the liquid crystal display device 32 by the first and second reflection surfaces 21a, 21b has been five in total, however, the number of times of total reflection may be appropriately changed. That is, by adjustment of the outer shape of the light guide member 21 (i.e., the thickness t, the distance D, the acute angles α, β), the number of times of total reflection of the image lights GL11, GL12 may be five in total and the number of times of total reflection of the image lights GL21, GL22 may be seven in total. Further, in the above description, the numbers of times of total reflection of the image lights GL11, GL12, GL21, GL22 have been odd numbers, however, if the light-incident surface IS and the light-exiting surface OS are located at the opposite sides, i.e., the light guide member 21 is formed in a parallelogram shape in the plan view, the numbers of times of total reflection of the image lights GL11, GL12, GL21, GL22 are even numbers.

E. Observation of Image Light from Virtual Image Display Device

Figure 7A:
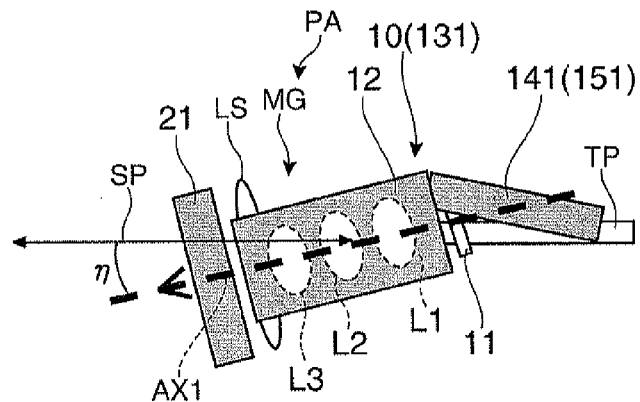
FIG. 7A schematically shows a structure of the virtual image display device.

As below, the observation of the image light output from the virtual image display device will be explained. FIG. 7A etc. schematically show the structure of the virtual image display device 100 when worn. Note that, here, for simplification, the observer PA is shown by the spectacles MG worn by the observer PA and the eyes EY of the observer PA.

Figure 7B:
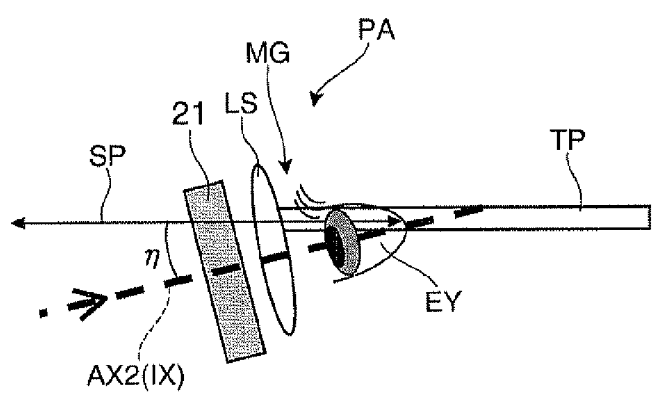
FIG. 7B is a diagram for explanation of an image optical axis.
Figure 7C:
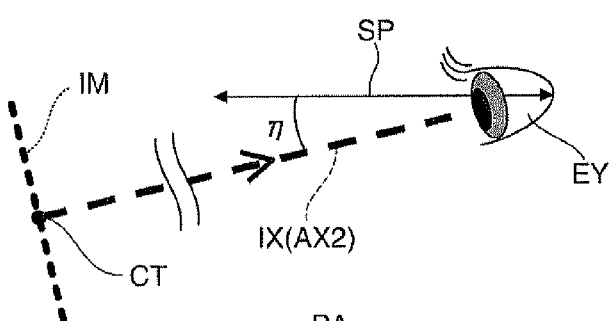
FIG. 7C is a diagram for explanation of a relationship between the image optical axis and a virtual image.

As shown in FIG. 2A etc., in the virtual image display device 100, the temple 141 has the cushion member 151 and the whole virtual image display device 100 tilts forward. That is, the first drive part 131 and the first panel part 111 forming the virtual image display device 100 tilt forward. In other words, as schematically shown in FIG. 7A, the temple 141 (cushion member 151) serves to raise the side near the back of the head of the observer PA of the virtual image display device 100 upward, and allows the whole of the component elements such as the image display unit 11, the projection system 12, and the light guide member 21 forming the image forming device 10 corresponding to the first drive part 131 to tilt forward. That is, the first optical axis AX1 as the projection optical axis of the projection system 12 tilts at the tilt angle η with respect to the direction in which the observer PA looks straight ahead, i.e., the front vision direction SP. Further, with the tilt of the first optical axis AX1 at the tilt angle η, as shown in FIG. 7B, the direction of the second optical axis AX2 as the center optical axis of the image light output through the light guide member 21 also tilts at the tilt angle η with respect to the front vision direction SP. In the case of the embodiment, the second optical axis AX2 corresponds to the image optical axis IX that determines the direction of eyes of the observer.

Figure 7D:
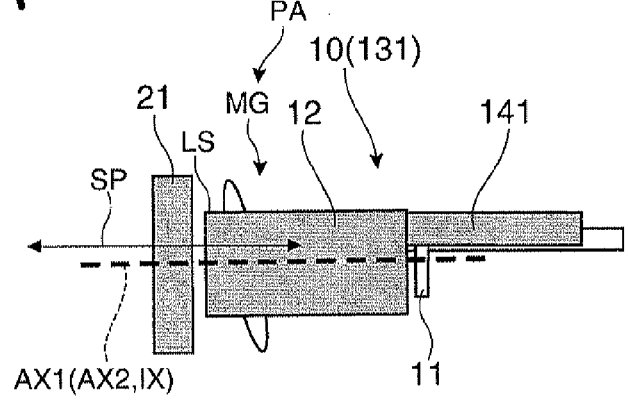
FIG. 7D shows a comparative example.

Here, the image optical axis IX of the image light indicates the observation direction of the observer PA as described above, and more specifically, corresponds to the principal ray of the component output from the center of the image of the image light parallelized and output from the light-exiting part B3 (see FIG. 3A etc.) of the virtual image display device 100. That is, as shown in FIG. 7D, the image optical axis IX is an axis on the line connecting the center CT of the projection image (virtual image) IM recognized by the observer PA as an image of an object to be observed and the eyes EY of the observer PA as an observation point. The observer PA usually observes the image with the point of view placed at the center of the object to be observed, and the image optical axis IX determines the direction of eyes of the observer PA who observes the image light. In the case of the embodiment, the whole virtual image display device 100 is tilted at the tilt angle η, and the second optical axis AX2 as the optical axis at the exit side of the image light is the image optical axis IX itself.

Unlike the virtual image display device with the temple 141 having no cushion member 151 as shown in FIG. 7D as the comparative example, in the virtual image display device 100, the direction of the first optical axis AX1, i.e., the image optical axis IX is not in parallel to the front vision direction SP, and tilts in the bird's eye direction corresponding to the condition that the observer PA sees downward, i.e., takes a bird's eye view at the tilt angle η. In this case, the direction of eyes of the observer PA is the direction along the naturally tilting image optical axis IX, and the observer PA continues to observe the image light in the slightly downward view. The human eye EY has a structure desirably continuing observation in the bird's eye view of seeing downward at equal to or more than 7°, preferably at about 10° to 15° from the front vision direction SP. Accordingly, for example, the lens surface LS of the typical spectacles MG is not perpendicular to the extension direction of the temple TP, but slightly tilts forward. On the other hand, like the case of the comparative example shown in FIG. 7D, when the image optical axis IX coincides with the respective optical axes AX1, AX2 as seen from the side and is in parallel to the front vision direction SP, the observer PA looks straight ahead and continues to see the image with the eyes EY relatively wide open, and eyelids take heavy strain. In the virtual image display device 100 of the embodiment, as shown in FIGS. 7A, 7B, etc., the image optical axis IX is tilted to the same extent with respect to the front vision direction SP as that of the typical spectacles MG or the like. That is, the light guide member 21 is opposed to the lens surface LS of the spectacles MG nearly right in front. Thereby, the direction of eyes of the observer PA is naturally lowered and the strain on the eyes EY is reduced.

As described above, in the virtual image display device 100, according to the embodiment, the cushion member 151 is provided and the projection system 12 and the light guide unit 20 are tilted at the tilt angle η with respect to the front vision direction SP. Thereby, the direction adjustment of the image optical axis IX, i.e., the angle adjustment of the direction of eyes of the observer PA can be performed, and the strain on the eyes EY of the observer PA during use of the virtual image display device 100 is reduced. Therefore, even in the case where the virtual image display device 100 is used over a long period, for example, the stress on the observer PA may be suppressed. As described above, the cushion members 151, 152 are projection optical axis adjustment parts provided in the parts corresponding to the locations of the ears of the observer and tilting the first optical axis AK with respect to the front vision direction SP, and function as a tilt angle adjusting unit that adjusts the tilt angle η. In the above description, the value of the tilt angle η is set to about 7°, however, the value of the tilt angle η is not limited and may be adjusted to various values by adjusting the sizes of the cushion members 151, 152.

Note that the cushion members 151, 152 shown in FIG. 1 etc. may be in contact with the sides of the head of the observer PA. The cushion members 151, 152 sandwich the head of the observer PA with appropriate tension, and thereby, the weight of the virtual image display device 100 on the observer PA may be moderately distributed and the fatigue in observation in a long period may be further reduced.

Second Embodiment

As below, a virtual image display device of the second embodiment will be explained with reference to FIGS. 8A to 8D. Note that the virtual image display device 200 of the embodiment is a modified example of the virtual image display device 100 of the first embodiment and the parts or items without particular explanation are the same as those of the first embodiment, and only FIGS. 8A to 8C corresponding to FIGS. 7A to 7C and FIG. 8D schematically showing optical paths are shown and illustration and explanation of the whole configuration etc. will be omitted.

Figure 8A:
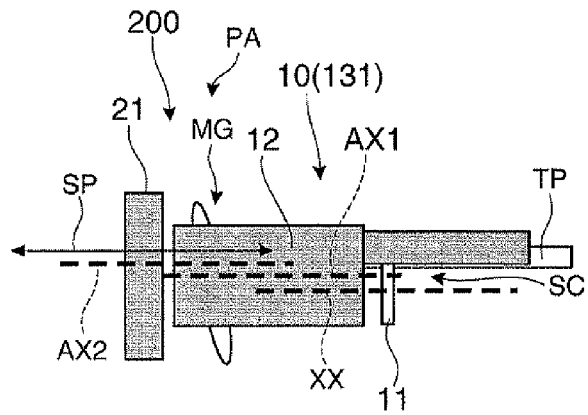
FIG. 8A schematically shows a structure of a virtual image display device of the second embodiment.

As shown in FIG. 8A, in the virtual image display device 200 of the embodiment, the image display unit 11, the projection system 12, the light guide member 21, etc. forming the image forming device 10 do not tilt forward unlike those in the virtual image display device 100. In other words, the first optical axis AX1 of the projection system 12, i.e., the projection optical axis is in parallel to the front vision direction SP.

Figure 8B:
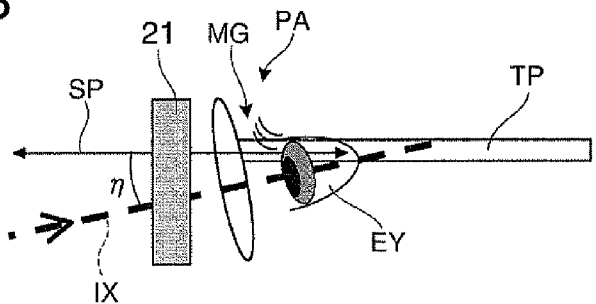
FIG. 8B is a diagram for explanation of an image optical axis.

On the other hand, the display center axis XX as the center axis of the image display unit 11 is in parallel to the first optical axis AX1 of the projection system 12, but shifted downward in the vertical direction as illustrated. That is, the virtual image display device 200 has a shift structure SC in which the display center axis XX of the image display unit 11 is shifted from the first optical axis AX1, and the displayed image is also shifted downward with respect to the observer PA. Thereby, as shown in FIGS. 8B and 8C, the center CT of the projection image (virtual image) IM as the object to be observed is shifted downward by the distance DD compared to the center CTa of a projection image (virtual image) IMa if not shifted, and the direction adjustment of the image optical axis IX is performed, i.e., the direction of eyes of the observer PA is directed downward.

The above described structure of shifting the image will be explained using optical paths schematically shown in FIG. 8D. The respective luminous flux components PX of the image light output from the center 11c of the image display unit 11 are parallelized in the projection system 12, and reach the eyes EY of the observer PA through the fourth reflection surface 21d of the light guide unit 20 (not shown). In this case, the luminous flux components PX are output from the center 11c and correspond to the principal ray of the component output from the center of the image of the image light. That is, the center luminous flux of the luminous flux components PX is the image optical axis IX and the angle of the luminous flux components PX with respect to the front vision direction SP is the tilt angle η. In the embodiment, as illustrated, the display center axis XX of the image display unit 11 is shifted with respect to the first optical axis AX1 of the projection system 12, and further, the second optical axis AX2 as the center axis of the fourth reflection surface 21d is also shifted. By adjustment of the amounts of shift, the adjustment of the angle of the luminous flux components PX, i.e., the tilt angle η of the image optical axis IX can be performed.

As described above, in the embodiment, the shift structure SC in the image display unit 11 and the projection system 12 functions as the tilt angle adjusting unit that adjusts the direction of the image optical axis IX, i.e., adjusting the angle of the tilt angle η.

Figure 8C:
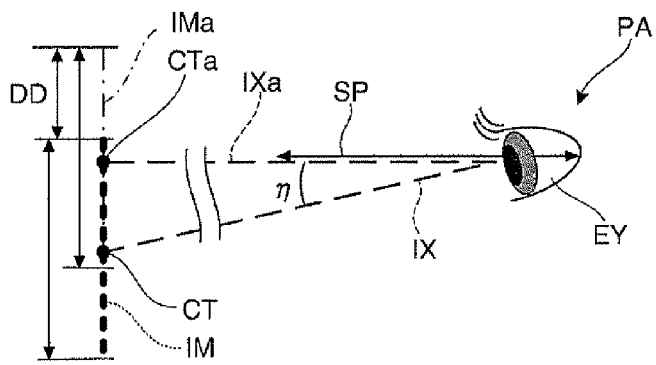
FIG. 8C is a diagram for explanation of a relationship between the image optical axis and a virtual image, and FIG. 8D schematically shows optical paths of the virtual image display device.
Figure 8D:
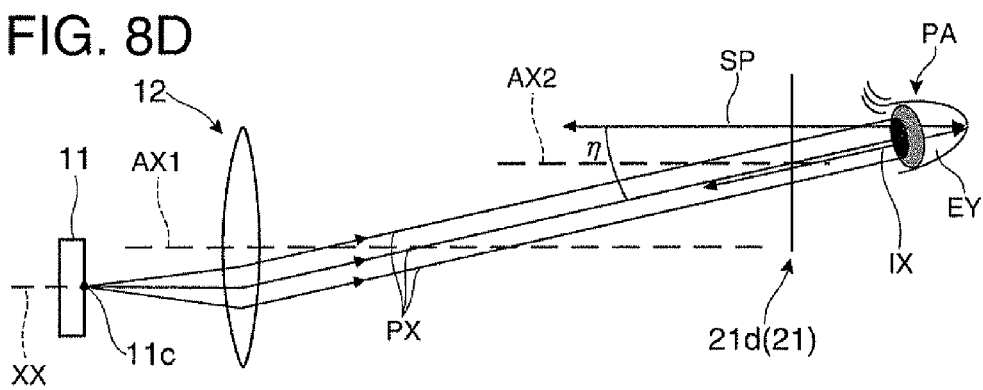

Note that, in the above described configuration, by adjusting the effective regions of the light-incident part B1, the light guide part B2, and the light-exiting part B3 (see FIG. 3A) of the light guide member 21, i.e., the regions that can function as the reflection surfaces 21c, 21d, etc. in response to the amount of shift of the image display unit 11 according to need, the image light may be reliably propagated so that a part of the projection image (virtual image) IM shown in FIG. 8C may not be lost.

Note that, in this case, it is not necessary to tilt the whole virtual image display device 200 when worn, and the same shape as the shape of the typical spectacles or sunglasses may be employed. That is, the side shape of the whole virtual image display device 200 extends nearly in parallel to the front vision direction SP, i.e., extends nearly along the temple TP of the spectacle MG worn by the observer PA. Thereby, specifically, when the virtual image display device 200 is worn over the spectacles, the smaller device in better design qualities without feeling of incongruity as the shape of the spectacles may be easily realized.

As described above, in the virtual image display device 200 according to the embodiment, the amount of shift between the image display unit 11 and the projection system 12 is adjusted, and thereby, the direction adjustment of the image optical axis IX, i.e., the angle adjustment of the direction of eyes of the observer PA can be performed and the strain on the eyes EY of the observer PA may be reduced. Accordingly, for example, even when the virtual image display device 200 is used over a long period, the stress on the observer PA may be suppressed.

Third Embodiment

As below, a virtual image display device of the third embodiment will be explained with reference to FIG. 9A, etc. Note that the virtual image display device of the embodiment is a modified example of the virtual image display device 100 of the first embodiment and the parts or items without particular explanation are the same as those of the first embodiment, and illustration and explanation of the whole configuration etc. will be omitted.

Figure 9A:
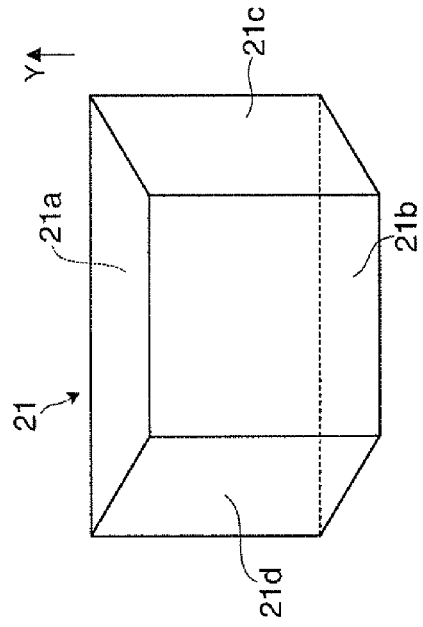
FIG. 9A shows a light guide member for explanation of a virtual image display device of the third embodiment.
Figure 9C:
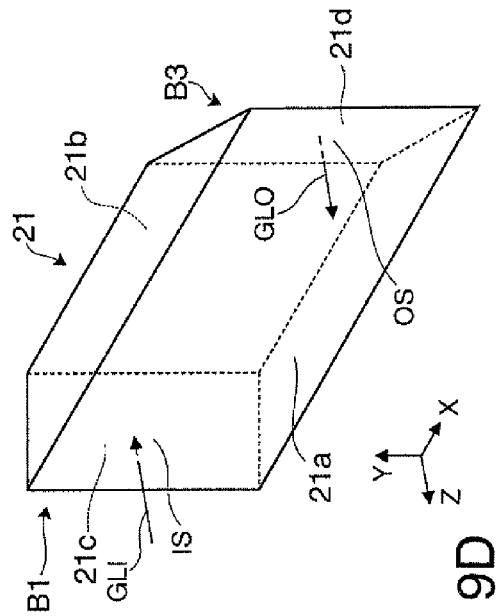
FIG. 9C shows a light guide member of a comparative example.
Figure 9B:
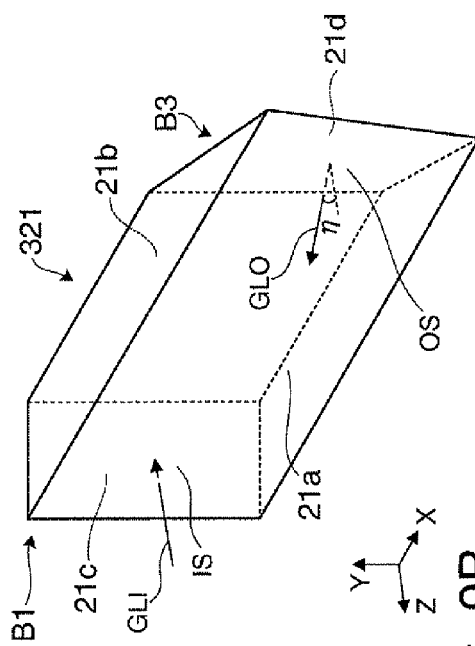
FIG. 9B is a perspective view of the light guide member.
Figure 9D:
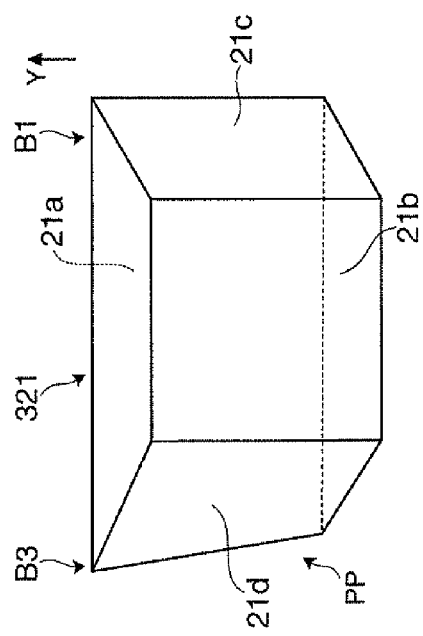
FIG. 9D is a perspective view of the light guide member of the comparative example.
Figure 10:
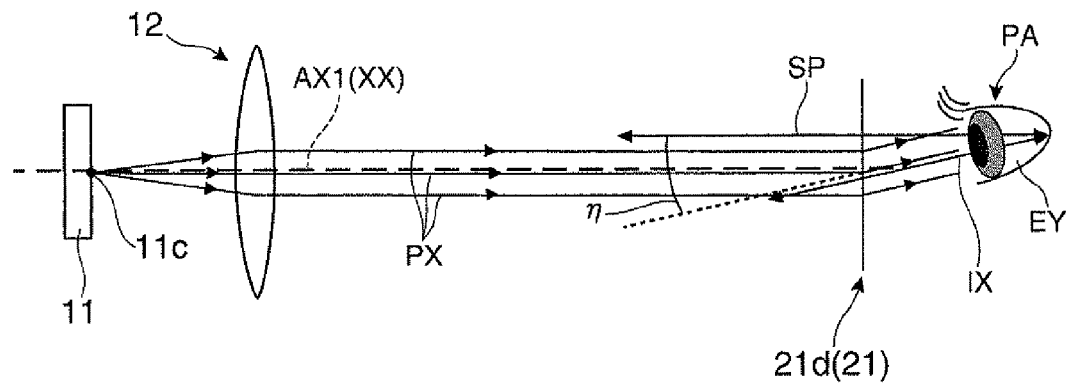
FIG. 10 schematically shows optical paths of the virtual image display device of the third embodiment.

In the embodiment, as shown in FIGS. 9A and 9B, a light guide member 321 forming the virtual image display device of the embodiment has an image extraction surface adjustment structure PP tilted so that the normal direction of the fourth reflection surface 21d may have a component with respect to the Y direction. Thereby, the image optical axis of the image light reflected and output by the fourth reflection surface 21d may be tilted. Note that the appearance and the structure of the virtual image display device of the embodiment are different from those of the virtual image display device 100 of the first embodiment in that the cushion members 151, 152 are not provided, and further, different from those of the virtual image display device 200 of the second embodiment in that the shift structure SC is not provided. Therefore, the appearance is the same as that in the case of the comparative example shown in FIG. 7D. In the case of the first embodiment, for example, like the light guide member 21 shown in FIGS. 9C and 9D or the light guide member 21 of the light guide unit 20 shown in FIGS. 3A and 3B as comparative examples, the third reflection surface 21c and the fourth reflection surface 21d tilt at angles α, β determined with the Y-axis as the rotation axis from the states in parallel to the XY plane. In this case, as shown in FIG. 9D, for example, a component GLI entering the light-incident surface IS from the +Z direction is output from the light-exiting surface OS as a component GLO in the −Z direction. That is, even the component through the respective reflection surfaces 21c, 21d has no direction component in the Y direction at the light exit side. On the other hand, in the embodiment, as shown in FIGS. 9A and 9B, for example, the tilt of the fourth reflection surface 21d is adjusted, i.e., the normal direction of the reflection surface 21d is tilted to have a component with respect to the Y direction. Thereby, the image optical axis of the image light when output from the light-exiting surface OS may be tilted to have a component with respect to the Y direction. Specifically, as shown in FIG. 10, the image optical axis IX is determined by the luminous flux component PX output from the center 11c of the image display unit 11, and has a function of adjusting the luminous flux component PX, i.e., the tilt angle η of the image optical axis IX by adjusting the angle of the fourth reflection surface 21d. Note that, in this case, the region of the reflection surface 21d, i.e., the region forming the semi-transmissive reflection film is provided not on the entire surface, but distributed toward the lower side (periphery side) of the light transmission region passing external light or the like of the light guide member 21 in response to the direction in which the image optical axis of the image light is tilted, i.e., the −Y side. Further, the tilted surface is not limited to the fourth reflection surface 21d as in the above description, but, for example, the third reflection surface 21c may be tilted.

As described above, in the embodiment, the image extraction surface adjustment structure PP of adjusting the angles of the third reflection surface 21c for guiding the image light into the light guide member 21 and the fourth reflection surface 21d for taking the image light to the outside is provided as a tilt angle adjustment unit that adjusts the tilt angle η of the image optical axis IX of the image light, and thus, the direction of eyes of the observer may be naturally lowered.

Others

The invention has been explained according to the embodiments, however, the invention is not limited to the above described embodiments and may be implemented in various forms without departing from the scope of the invention. For example, the following modifications may be made.

First, not only in the third embodiment but also in the first and second embodiments, the region of the reflection surface 21d, i.e., the region forming the semi-transmissive reflection film is provided not on the entire surface, but distributed toward the lower side (periphery side) of the light transmission region passing external light or the like of the light guide member 21 in response to the direction in which the image optical axis of the image light is tilted.

Further, in the first embodiment, the light guide unit 20 is also tilted with the projection system 12, however, a structure in which only the projection system 12 is tilted may be employed. In this case, the image optical axis of the image light through the light guide unit 20 is not necessarily in parallel to the projection optical axis of the projection system 12, however, by appropriately adjusting the way of tilting, the image light may be output with the image optical axis tilted in a desired direction.

Furthermore, the projection system 12 is provided in all of the above embodiments, however, for example, a configuration without the projection system 12 in which the image light formed in the image display unit 11 may be directly guided to the light guide unit 20. In this case, the tilt angle adjusting unit is formed by the image extraction surface adjustment structure PP shown in FIG. 9A etc., for example, and thereby, the image optical axis IX of the image light may be adjusted and the direction of eyes of the observer may be naturally lowered.

In the above described embodiment, the virtual image display device 100 has been explained as a see-through type, however, the invention may be applied to a head-mounted display, not the see-through type.

In the embodiments, directionality has not been particularly provided to the illumination light SL from the illumination device 31, however, directionality in response to the position of the liquid crystal display device 32 may be provided to the illumination light SL. Thereby, the liquid crystal display device 32 may be efficiently illuminated and brightness irregularities depending on the position of the image light GL may be reduced.

In the embodiments, the display brightness of the liquid crystal display device 32 has not particularly been adjusted, however, display brightness may be adjusted in response to the ranges and overlapping of the projection images IM1, IM2 as shown in FIG. 6B or the like.

In the embodiments, the transmissive liquid crystal display device 32 or the like has been used as the image display unit 11, however, various devices other than the transmissive liquid crystal display device 32 may be used as the image display unit 11. For example, a configuration using a reflective liquid crystal display device may be employed, or a digital micromirror device or the like may be employed in place of the liquid crystal display device 32. Further, a self-emitting device represented by an LED array, an OLED (organic EL), or the like may be used as the image display unit 11.

In the virtual image display device 100 of the embodiment, the image forming devices 10 and light guide units 20 have been provided in pairs in correspondence to both the right eye and the left eye, however, the image forming device 10 and light guide unit 20 may be provided only for either of the right eye or the left eye for observation by a single eye.

In the embodiments, the first optical axis AX1 passing through the light-incident surface IS and the second optical axis AX2 passing through the light-incident surface IS have been in parallel, however, the optical axes AX1, AX2 may be made not in parallel.

In the embodiments, extraction of an image in the light-exiting part B3 is performed by the fourth reflection surface 21d having the single-plate reflection surface, however, the above described tilt angle adjusting unit may be provided not only in the virtual image display device of this type, but also in a virtual image display device of a type having an angle conversion part that extracts an image using plural reflection surfaces, for example, and extracting the image lights entering at different angles in the first and second reflection surfaces 21a, 21b by total reflection at different times. As an example of the device having the angle conversion part, for example, a structure in which the angle conversion part has many half mirror layers arranged at a tilt with respect to the first and second reflection surfaces 21a, 21b in parallel to one another at equal intervals is conceivable. In this case, a component of the image light entering the first reflection surface 21a at the maximum reflection angle of the image lights and totally reflected by the first and second reflection surfaces 21a, 21b is converted in angle by the reflection at the side nearest the entrance (+X side) of the angle conversion part and extracted. A component entering the first reflection surface 21a at the minimum reflection angle and totally reflected by the first and second reflection surfaces 21a, 21b is converted in angle by the reflection at the deepest side (−X side) of the angle conversion part and extracted. Further, as another example having the angle conversion part, for example, a device in which the angle conversion part has many reflection units of pairs of the first reflection surface and the second reflection surface tilting at different angles to each other with respect to the first and second reflection surfaces 21a, 21b arranged in stripes is conceivable. In this case, the component of the image light entering at the maximum reflection angle is extracted at the deepest side (−X side) and the component of the image light entering at the minimum reflection angle is extracted at the side nearest the entrance (+X side). Furthermore, in this case, the image light through one reflection unit is extracted at a desired angle after passing only once in the angle conversion part without passing through the other reflection units.

In the above explanation, the specific explanation has been made with the virtual image display device 100 as the head-mounted display, however, the virtual image display device 100 may be altered to a head-up display.

In the above explanation, in the first and second reflection surfaces 21a, 21b, the image lights have been totally reflected and guided by interfaces between air and themselves without mirrors, half-mirrors, or the like formed on the surfaces, however, the total reflection in the invention includes reflection by mirror coatings or half-mirror films formed on the entire or parts of the first and second reflection surfaces 21a, 21b. For example, the case where the incident angle of the image light satisfies the total reflection condition and mirror coatings or the like are formed on the entire or parts of the first and second reflection surfaces 21a, 21b and all of the image light is substantially reflected may be included. Further, as long as image light with sufficient brightness is obtained, the entire or parts of the first and second reflection surfaces 21a, 21b may be coated with mirrors with some transmissivity.

In the above description, the light guide member 21 extends in the lateral direction in which the eyes EY are arranged, however, the light guide member 21 may extend in the longitudinal direction. In this case, the optical panels 110 are arranged in parallel not in series but side by side.

Further, the invention may be applied to various HMD of other systems not limited to the above described system, and may be applied to a direct-view-type HMD, for example.

The entire disclosure of Japanese Patent Application No. 2011-222585, filed Oct. 7, 2011 is expressly incorporated by reference herein.

What is claimed is:

1. A virtual image display device comprising:
    an image display unit that forms image light;
    a projection system that forms a virtual image by the image light output from the image display unit;
    a light guide unit having a light-incident part that takes the image light that has passed through the projection system inside, a light guide part that guides the image light taken from the light-incident part by total reflection, and a light-exiting part that takes the image light through the light guide part to the outside;
    a frame that supports the light guide unit; and
    a tilt angle adjustment unit that adjusts an image optical axis of the image light output from the light guide unit in a direction at a tilt with respect to a front vision direction corresponding to the front of eyes of an observer, wherein the tilt angle adjustment unit comprises a projection axis adjustment unit configured to tilt a projection optical axis of the projection system, the projection axis adjustment unit including a cushion member in a part corresponding to a location of an ear of the observer, the cushion member sized to adjust a tilt of the projection optical axis to thereby tilt the image optical axis.

2. The virtual image display device according to claim 1, wherein the tilt angle adjustment unit is a projection optical axis adjustment unit that tilts a projection optical axis of the projection system with respect to the front vision direction.

3. The virtual image display device according to claim 2, wherein the projection optical axis adjustment unit tilts the projection optical axis by tilting the whole projection system, and tilts the whole light guide unit.

4. The virtual image display device according to claim 3, wherein the projection optical axis adjustment unit is a cushion member provided in a part corresponding to a location of an ear of the observer of the frame.

5. The virtual image display device according to claim 1, wherein the tilt angle adjustment unit is a shift structure in which a display center axis of the image display unit extending in parallel to the projection optical axis of the projection system is shifted in a direction perpendicular to the projection optical axis of the projection system.

6. The virtual image display device according to claim 5, wherein the light guide unit adjusts effective regions of the light-incident part, the light guide part, and the light-exiting part in response to an amount of shift of the image display unit by the shift structure.

7. The virtual image display device according to claim 5, wherein a direction in which the projection optical axis of the projection system extends is along the front vision direction.

8. The virtual image display device according to claim 1, wherein the tilt angle adjustment unit has a reflection surface for taking the image light in the light-exiting part to the outside, and is an image extraction surface adjustment structure of adjusting an angle of the reflection surface.

9. The virtual image display device according to claim 1, wherein the tilt angle adjustment unit has a reflection surface for taking the image light in the light-exiting part to the outside, and a region of the reflection surface is distributed toward a periphery side of a light transmission region of the light guide unit in response to the direction in which the image optical axis of the image light is tilted.

10. The virtual image display device according to claim 1, wherein the tilt angle adjustment unit tilts the image optical axis of the image light in a bird's eye direction corresponding to a side below the observer with respect to the front vision direction.

11. The virtual image display device according to claim 1, wherein the tilt angle adjustment unit tilts a tilt angle of the image optical axis of the image light by seven degrees or more with respect to the front vision direction.

12. The virtual image display device according to claim 1, wherein the light guide unit has a first reflection surface and a second reflection surface that are provided in parallel to each other and enable light guide by total reflection,
    the light-incident part has a third reflection surface forming a predetermined angle with respect to the first reflection surface, and
    the light-exiting part has a fourth reflection surface forming a predetermined angle with respect to the first reflection surface.

13. A virtual image display device comprising:
    an image display unit that forms image light;
    a projection system that forms a virtual image by the image light output from the image display unit;
    a light guide unit having a light-incident part that takes the image light that has passed through the projection system inside, a light guide part that guides the image light taken from the light-incident part by total reflection, and a light-exiting part that takes the image light through the light guide part to the outside;

a frame that supports the light guide unit; and a tilt angle adjustment unit that adjusts an image optical axis of the image light output from the light guide unit in a direction at a tilt with respect to a front vision direction corresponding to the front of eyes of an observer, wherein the tilt angle adjustment unit comprises a projection axis adjustment unit configured to tilt a projection optical axis of the projection system, the projection axis adjustment unit including a cushion member in a part corresponding to a location of an ear of the observer, the cushion member physically configured to adjust a tilt of the projection optical axis to achieve a desired tilt of the image optical axis.

14. A virtual image display device comprising:

an image display unit that forms image light;

a projection system that forms a virtual image by the image light output from the image display unit;

a light guide unit having a light-incident part that takes the image light that has passed through the projection system inside, a light guide part that guides the image light taken from the light-incident part by total reflection, and a light-exiting part that takes the image light through the light guide part to the outside;

a frame that supports the light guide unit; and a tilt angle adjustment unit that adjusts an image optical axis of the image light output from the light guide unit in a direction at a tilt with respect to a front vision direction corresponding to the front of eyes of an observer, wherein the tilt angle adjustment unit is configured to adjust an image optical axis of the image light output from the light guide unit by cushioning a frame of the virtual display device about ears of the observer.

* * * * *